United States Patent [19]
Olikara et al.

[11] Patent Number: 4,561,614
[45] Date of Patent: Dec. 31, 1985

[54] DEPLOYABLE FOLDED MULTI-ELEMENT SATELLITE SUBSYSTEMS

[75] Inventors: Philip Olikara, Plainsboro; Derek S. Binge, Hamilton Square, both of N.J.

[73] Assignee: RCA Corporation, Princeton, N.J.

[21] Appl. No.: 447,695

[22] Filed: Dec. 7, 1982

[51] Int. Cl.$^4$ .......................... B64G 1/44; B64G 1/22
[52] U.S. Cl. .................................. 244/173; 188/274; 188/306
[58] Field of Search .................. 244/158 R, 173; 188/274, 276, 277, 306; 16/175

[56] References Cited

U.S. PATENT DOCUMENTS

| | | | |
|---|---|---|---|
| 2,065,832 | 12/1936 | Spyker | 188/274 |
| 2,139,817 | 12/1938 | Gogan | 188/274 |
| 3,067,841 | 12/1962 | Kendall | 188/274 |
| 3,672,475 | 6/1972 | Nash | 188/306 |
| 4,155,524 | 5/1979 | Marello et al. | 244/173 |
| 4,290,168 | 9/1981 | Binge | |

OTHER PUBLICATIONS

Hasbach, "Lightweight Solar Panel Development" NASA TR 32-1519, Mar. 15, 1971.

Primary Examiner—Galen L. Barefoot
Attorney, Agent, or Firm—J. S. Tripoli; R. L. Troike

[57] ABSTRACT

A solar panel satellite subsystem includes a first and second set of solar panels and booms joined together end to end in series and to opposite sides of the spacecraft by spring bias hinges. These hinges include viscous fluid dampers. Each damper has its own heater and thermostat coupled thereto to maintain essentially the same damper temperature as the ground test temperature at each hinge and maintain essentially the same desired rate of deployment at each hinge.

2 Claims, 7 Drawing Figures

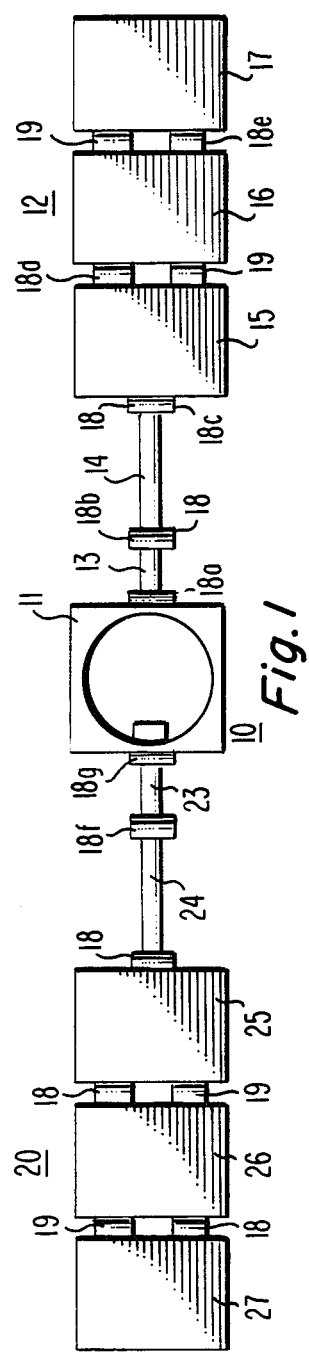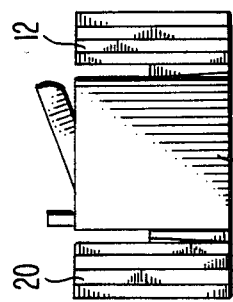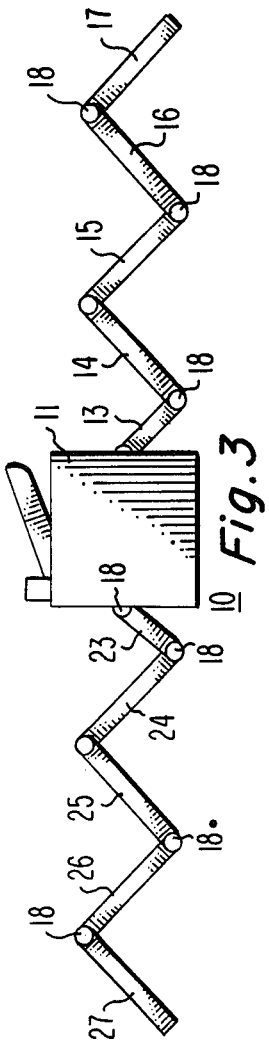

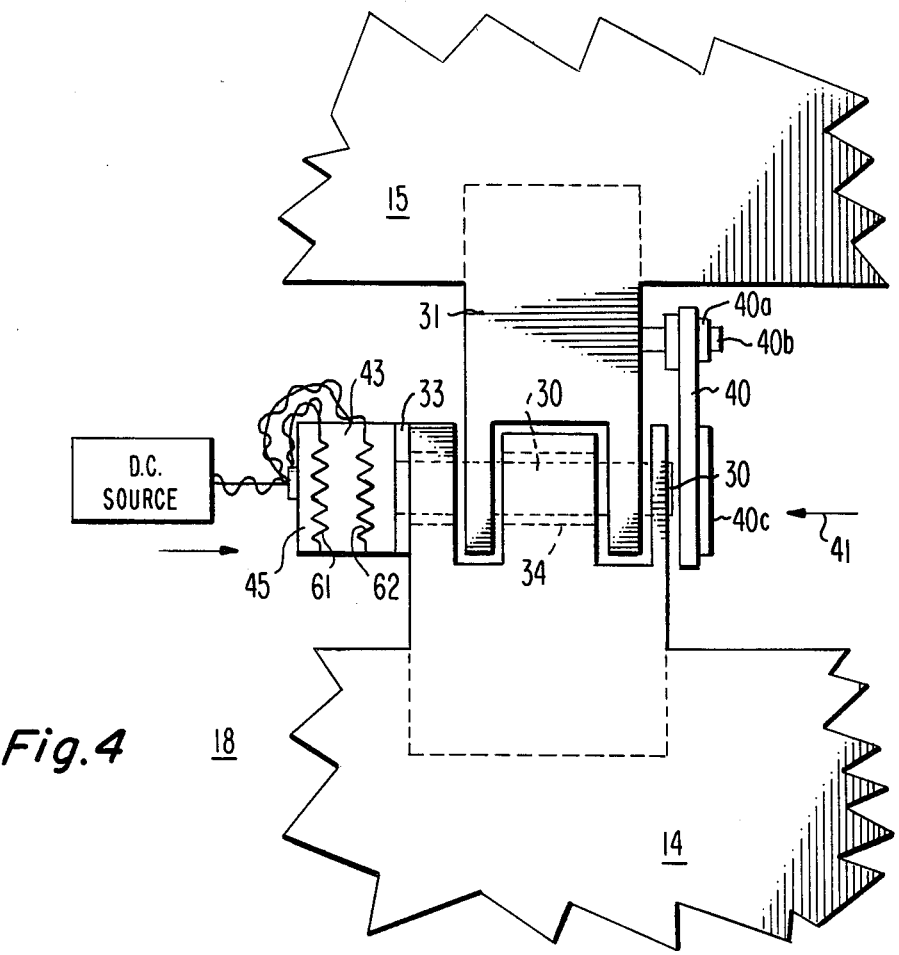
Fig.4
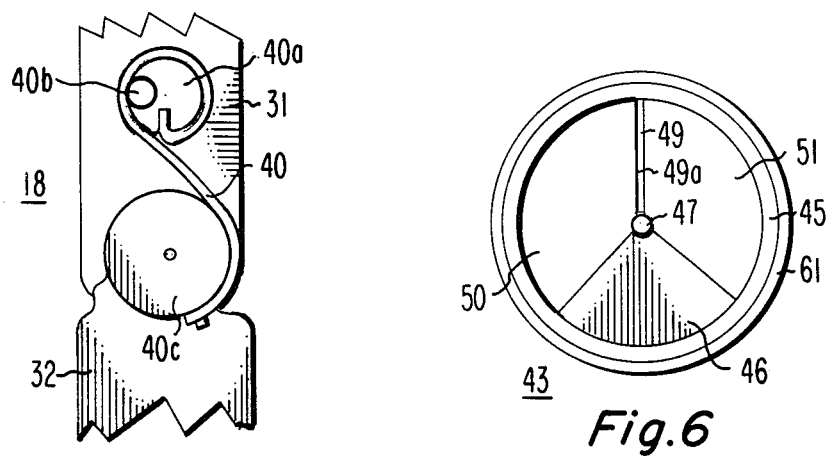
Fig.5
Fig.6

DEPLOYABLE FOLDED MULTI-ELEMENT SATELLITE SUBSYSTEMS

This invention relates to a deployable folded satellite subsystem such as the solar panel subsystem of a spacecraft, which is deployed from a folded to an extended position and more particularly to a freely deployed subsystem which does not include tether lines to control deployment.

Satellites often have large deployable panels and/or booms which are hinged together or hinged to the main spacecraft body. The deployment is triggered by a control signal to the spacecraft which causes the release of some retainer mechanism. This retainer mechanism may be released by, for example, an electronically triggered pyrotechnic device. Then by a spring mechanism in the hinge, for example, the panels are deployed.

It sometimes occurs that the panels are sprung open too fast or some panels are sprung at a different rate of speed than other panels. This can cause damage to the lightweight panels or booms supporting them and can cause high disturbance forces to be imparted (nutation for example) to the spacecraft. A damping mechanism, such as a viscous damper may be employed to slow down or retard the deployment of the booms and/or panels. Viscous damping is highly dependent on the ambient temperature which affects the viscosity of the fluid in the damper. Satellites are often subjected to large differences in temperature, from relatively high values when under direct sunlight to low values when shadowed from the sun, so that a viscous damper when used in a satellite often experiences large differences in its damping rate. For a large deployable multielement structure these temperatures may vary dramatically from element to element over the length of the structure.

The proper deployment of solar panels for example, is an important matter. Failure of such panels, and/or booms, to operate and deploy correctly can cause failure of the complete mission which can cost many millions of dollars. It has been reported that at least one satellite designed for a seven year life ran out of station keeping fuel in about six months time after much of it had been exhausted shaking loose a sticky hinge antenna and a solar sail.

This deployment problem is further increased when one is deploying a plurality of solar panels which extend from opposite sides of the spacecraft with the joints between the panels being exposed to differing amounts of the sun depending on the position of the sun with respect to the spacecraft. The temperature variations can differ from about $-50°$ C. to $+50°$ C.

In accordance with an embodiment of the present invention an improved deployable folded satellite subsystem, deployable from a main spacecraft body includes a set of structural elements with the structural elements joined end to end using a spring biased hinge between the structural elements and one end of the set joined by a spring bias hinge to one surface of the main body, to form a deployable folded structure so that the set of structure elements are deployed from a folded position against and parallel to the one surface of the main body to an extended position generally perpendicular to the one surface due to forces provided by the spring bias. Each spring bias hinge further includes a viscous damper for damping the rate of deployment of the elements. Each of the hinges includes its own heater and thermostat at the damper for maintaining the temperature of the fluid in the damper of each hinge at substantially the same predetermined level and thereby maintain the deployment rate of all of said structure elements equal.

In the drawing:

FIG. 1 is a plan view sketch of a satellite system with solar panel subsystem extending from the main body of the spacecraft, FIG. 2 is another sketch of the satellite system of FIG. 1 illustrating the solar panel subsystem in its folded position;

FIG. 3 is another in view of the satellite system of FIG. 1 with the solar panel subsystem partly extended, FIG. 4 is a sketch of a hinge used in FIG. 1;

FIG. 5 is a sketch illustrating the spring biasing of the hinge of FIG. 4,

FIG. 6 illustrates a cross sectional view of the viscous damper in FIG. 4; and

Figure 7:
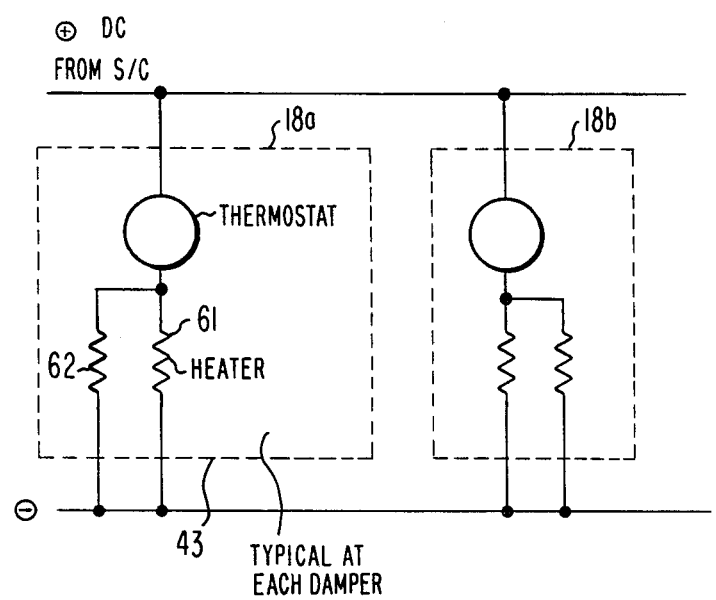
FIG. 7 is a schematic diagram of the heater circuitry.

Referring to FIG. 1 there is illustrated a satellite 10 comprising a main satellite body 11 with antenna 10a and a first set 12 of series connected structural elements 13 through 17. These structural elements are, for example, elements of a solar array comprising series connected lightweight booms 13 and 14 connected in series with series connected lightweight solar panels 15, 16 and 17.

These series connected elements 13 through 17 are connected together using spring bias hinges 18. The boom 13 is connected to the one surface 11a of the main spacecraft body via a 90° spring bias hinge 18a. Boom 14 is connected to boom 13 via a 180° spring bias hinge 18b. The boom 14 is connected in series to solar panel 15 via 180° spring bias hinge 18c. The solar panel 16 is connected to solar panel 15 via 180° spring bias hinges 18d and 19 and the solar panel 17 is connected to solar panel 16 via 180° spring bias hinges 18e and 19. The 90° hinge 18a has an end stop that allow the boom 13 to rotate 90° till it is perpendicular to surface 11a. The 180° hinges have end stops at 180° so the panels and the booms unfold to be coplanar with each other.

Similarly, a second set 20 of lightweight satellite elements 23 through 27 is connected to the opposite surface 11b of the satellite main body 11 to extend colinearly with said first set 12. The second set 20 of elements is identical to the first set and includes lightweight booms 23 and 24 connected in series by a 180° spring bias hinge 18f where boom 23 is connected to the main body via a 90° spring bias hinge 18g. The solar panels 25, 26 and 27 are connected together and to boom 24 via 180° spring bias hinges 18 and 19 as shown.

The solar panels and booms are connected together and hinged such that when the panels and boom are not deployed the booms and the panels are folded over each other as illustrated in FIG. 2. When the spacecraft is in the required orbit position a retainer mechanism, not shown, is released by ground command and the spring bias on the hinges causes the panels and booms to be deployed as illustrated in FIG. 3. These panels continue to unfold to the position illustrated in FIG. 1.

Since these panels and booms are generally made of very lightweight structures, the deployment rates of panels must be controlled to prevent damage to the panels and booms. A sufficient spring bias however, must be maintained in order to assure that the panels and booms will unfold. Each hinge contains a spring (for example a leaf spring) to provide the force required to deploy the system. Each hinge also contains a viscous fluid damper to control the rate of deployment.

When the panels and booms are deployed a force is applied on the spacecraft that depends on the rate and profile of deployment. The profile of deployment is the side view shape of the deployment as illustrated in FIG. 3. If the rate and profile of deployment of the panels and booms is not controlled, then not only can the panels and boom be damaged but the forces applied to the spacecraft could make it difficult to control the spacecraft. One of the primary causes of deployment control problems is the variety of temperatures seen by the dampers.

In accordance with the present invention the deployment system is made very reliable and predictable in rate and profile of deployment by maintaining the temperature of all of the dampers at substantially the same level (and at the test temperature) so the damping rate is the same as during ground test and therefore predictable. Further, by having the two similar subsystems with similar solar panels and booms, as shown in FIG. 1, deployed from opposite sides of the spacecraft and by having these hinges temperature controlled to substantially the same temperature, the resultant forces on the spacecraft tend to cancel. The two systems or sets of panels and booms (set 12 and set 20), deploy at substantially the same rate and profile with minimal disturbance on the spacecraft. After deployment, the power to the heater is turned off by ground command.

Referring to FIG. 4, there is illustrated a sketch of a spring bias hinge 18 according to the present invention. The hinge 18 includes a shaft 30 to which a panel, for example panel 15, is fixed via a U shaped clevis (flange) 31. The adjacent element, such as boom 14 for example, is rotatable about the shaft 30 via a flange 32 coupled to the boom 14. Flange 32 has apertures 34 therein through which the shaft 30 freely passes. The apertures 34 may include ball bearings to aid rotation of the shaft 30.

The hinge 18 may be like that shown and described in U.S. Pat. No. 4,290,168 of Derick S. Binge, which patent is incorporated herein by reference. A leaf spring 40 which may be made of spring sheet metal is coupled between the clevis 31 and flange 32 to provide biasing means for unfolding boom 14 about shaft 30.

FIG. 5 represents a sketch of the spring 40 as viewed in the direction of arrow 41 in FIG. 4. The spring 40 is wrapped around and fixed at one end to cylinder 40a. Cylinder 40a is engaged with shaft 40b which is attached to clevis (flange) 31. The other end of spring 40 is wrapped around and fixed to cylinder 40c on flange 32. As the spring exerts pressure, the shaft 30 rotates and this rotation is damped by a damper 43 (see FIG. 4) coupled to the shaft 30.

Referring to FIG. 6 there is illustrated, in a cross sectional view, the damper 43 as viewed along arrow 53. Damper 43 comprises a hollow cylinder defined by wall 45 with a central shaft 47 coupled to the shaft 30 and rotatable therewith. The damper 43 has a solid barrier portion 46 extending inward from wall 46. A fin 49 is coupled to the shaft 30 via shaft 47 and is rotatable therewith. Chambers 50 and 51 are formed by fin 49 and barrier position 46. Rotation of fin 49 increases the volume of one of chambers 50 and 51 while decreasing the other. Chambers 50 and 51 are filled with a viscous fluid. This fluid is for example a silicone fluid Type 200 of Dow Corning of Midland, Mich. The viscosity of the fluid is 50,000 centistokes at 25° C. The fin 49 includes an aperture 49a between the two chambers for allowing the passing of restricted amounts of fluid. This aperture size is adjusted to control the damping rate. It is 0.178 centimeter in diameter for present example. As the shaft 30 rotates so does shaft 47 and fin 49 which compresses the fluid in one chamber and the fluid flows through the aperture 49a into the other chamber to damp the spring bias provided by the spring 40.

In accordance with the present invention each of the dampers and each of the hinges includes a pair of heating elements 61 and 62 (See FIGS. 4 and 6), wrapped around the periphery of the housing 45 on the damper for heating the fluid in the damper. Each damper further includes a thermostat 63 coupled to the outer surface of the housing with the thermostat 63 coupled via electrical wiring 65 between a DC power source and the heating elements 61 and 62. These heating elements may be for example, thermofoil type heaters supplied by MINCO products of Minneapolis, Minn. The elements may be for example, 1.07 centimeters wide and about 36.6 centimeters long. Two heating elements are used for redundancy. The heating elements 61 and 62 are each 709 ohm resistive elements and they are coupled in parallel across the supply as shown in FIG. 7. As illustrated in FIG. 4, the damper 43 is thermally isolated from the rest of hinge 18 by insulator 33 so that the heaters only have to heat the damper.

Each of the hinges 18a, 18b, 18c, 18d, 18e etc. are similar to the one shown in FIG. 4 wherein they each contain their own thermostats and their own heating elements and are coupled in parallel across the power source as shown in FIG. 7. The thermostat for each pair of heating elements is set at a particular predetermined temperature such as about 22° C. This is approximately the temperature of the room where the hinges were originally tested. Also this temperature is at about the maximum temperature any part of this example satellite will experience for the particular orbit and orientation of this example satellite. If the satellite was in an orientation and orbit where the hinges would see +50° C., the predetermined temperature would be 50° C. and the room testing temperature would be +50° C. In this manner each of the hinges is heated to substantially the same temperature and therefore the viscosity of the fluid in each of the dampers should be substantially the same. The deployment rate for each of the panels and booms is therefore substantially the same. The fluid selected and the temperature selected is such that the rate of deployment is, for example, approximately 30 seconds. This rate of deployment has been found to be ideal for the type of lightweight structures involved. Shorter times on the order of 10 seconds have been found to cause damage to the lightweight structures and therefore highly undesirable.

We claim:

1. A method of deploying a satellite subsystem deployable from a folded position against a main spacecraft body to an extended position generally in a plane perpendicular to said body in a manner so as not to damage the subsystem and to minimize disturbance torques to the satellite when being deployed, said subsystem comprising a set of structural elements, said set of elements joined end to end and to one surface of said body by hinge means between each of said elements and bias hinge means between one of said elements closest to said body and said body, each of said hinge means including a viscous fluid damper for damping the rate of deployment of said elements, said method comprising the steps of:

testing the deployment of the elements before launch with all of said dampers heated at a predetermined temperature which at a minimum will be the maximum temperature any hinge damper will sense when the satellite is in its deployment position, after the satellite is in orbit heating all of the hinge dampers to said predetermined temperature, and once all dampers are heated to said predetermined temperature deploying said structural elements.

2. The combination of claim 1 wherein said predetermined temperature and said fluid is selected such that deployment time of said elements is greater than 10 seconds.

* * * * *